Oct. 20, 1953 P. F. ELARDE 2,656,504
ELECTROMAGNETIC MEASURING DEVICE
Filed July 11, 1945 2 Sheets-Sheet 1
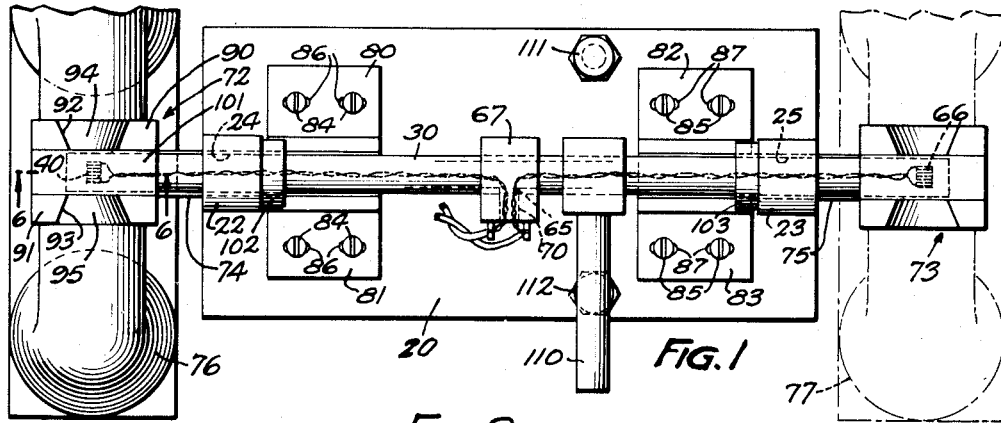
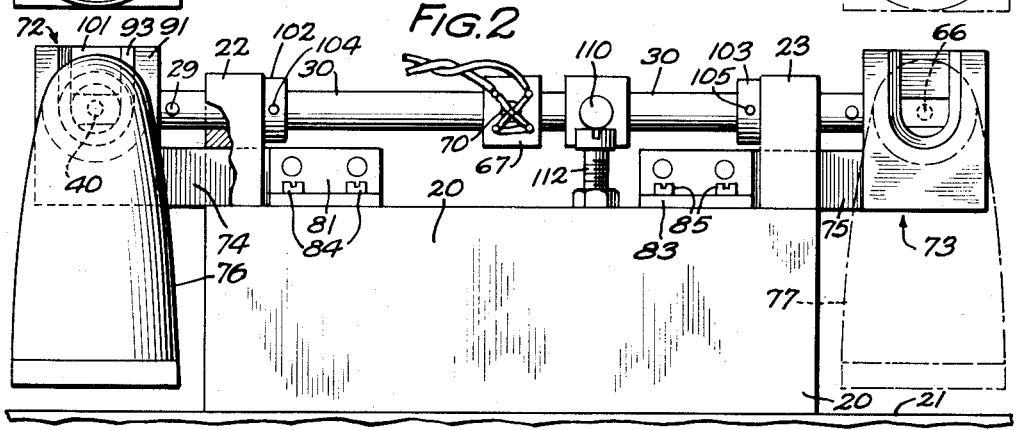
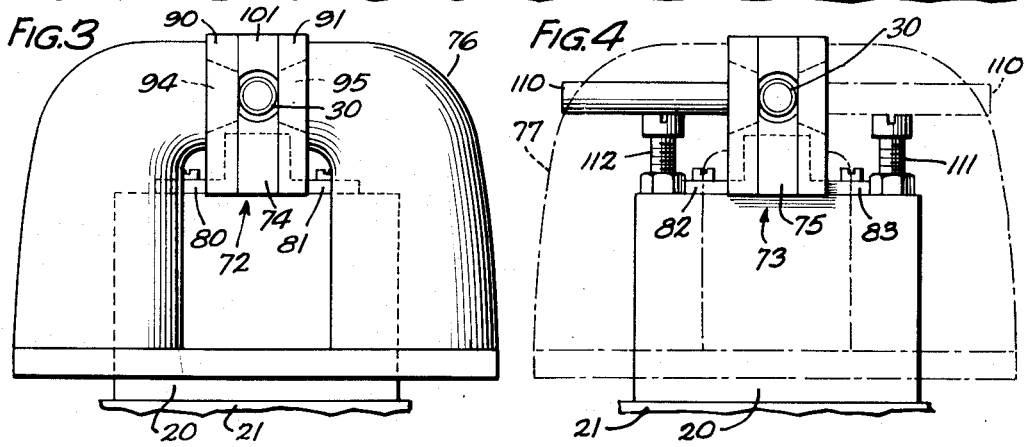
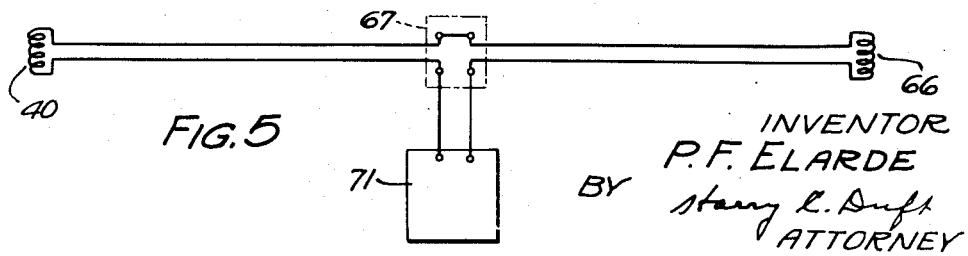
INVENTOR
P. F. ELARDE
BY
ATTORNEY

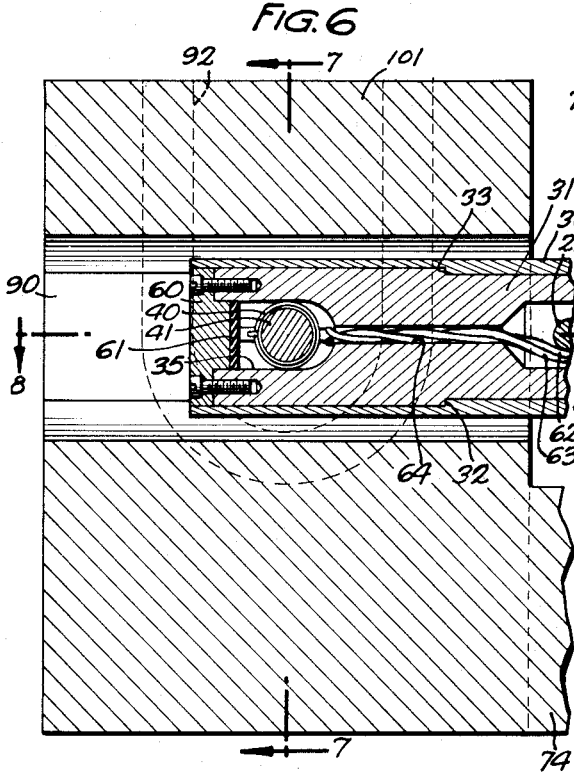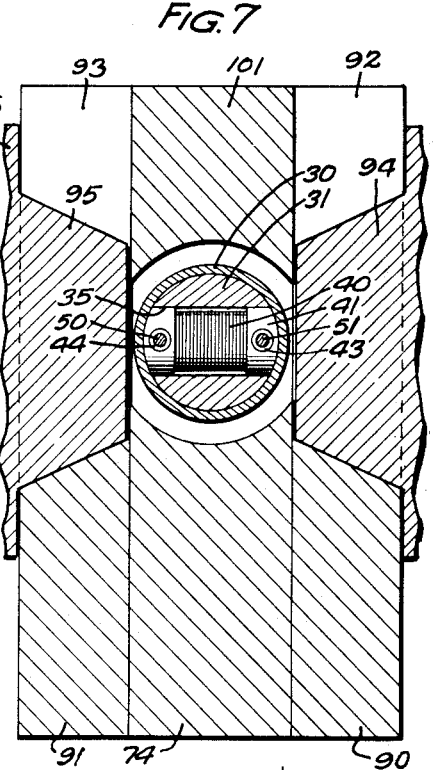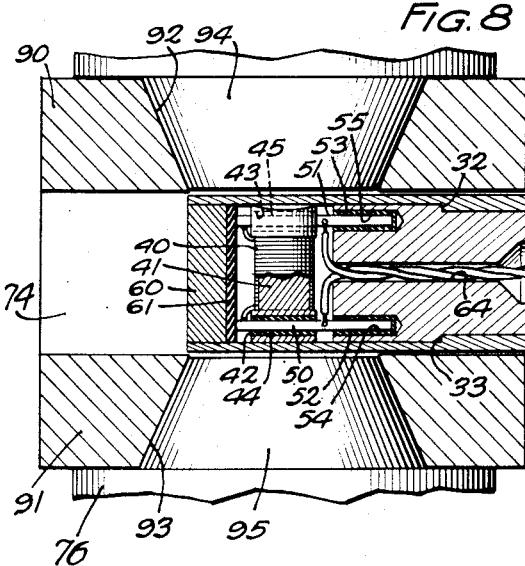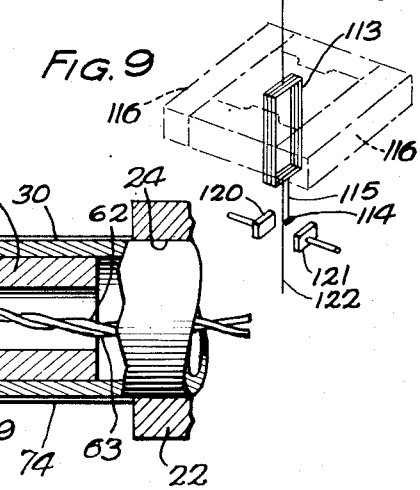

Patented Oct. 20, 1953

2,656,504

UNITED STATES PATENT OFFICE 2,656,504

ELECTROMAGNETIC MEASURING DEVICE

Paul F. Elarde, Westchester, Ill., assignor to Western Electric Company, Incorporated, New York, N. Y., a corporation of New York Application July 11, 1945, Serial No. 604,456

2 Claims. (Cl. 324—42)

This invention relates to an electromagnetic measuring device and more particularly to a magnetic flux measuring apparatus.

The measurement of the flux density of magnets is very difficult where close tolerances are required. Where critically narrow limits are prescribed, the conventional method of measuring flux, using a single search coil and fluxmeter, presents difficulties in reading the deflection of the fluxmeter with the required precision because the tolerances may approximate the observational error. For example, if a certain magnet gives a total deflection of 100 mm. on the fluxmeter and the required tolerance is ±1 mm. in terms of the fluxmeter, the observational error may be approximately the same, and, therefore, mask the true reading. If the total deflection were only that due to the tolerance, then the observational error would not interfere with the measurement because it is only a small percentage of the total deflection.

An object of this invention is to provide an efficient and effective electromagnetic measuring device.

In accordance with one embodiment of the invention, the flux value of a magnet under test is measured by rotating, through 180°, a pair of coils connected in series-opposing relation and in series with a fluxmeter, both coils simultaneously cutting two different magnetic fields. One of the coils cuts the field of a magnet to produce a known change in the number of flux linkages, while the second coil cuts the field of a second magnet whose flux value is to be determined. The coils being in series-opposing, the fluxmeter will register the difference between the known change in the number of flux linkages produced by the first coil and magnet and the change in the number of flux linkages produced by the second coil cutting the field of the magnet under test.

A complete understanding of the invention may be had by reference to the following description taken in conjunction with the accompanying drawings, wherein Fig. 1 is a plan view of the apparatus showing the standard magnet in position and an indication of the position of a magnet under test by dot and dash outline;

Fig. 2 is a front elevation of the apparatus;

Fig. 3 is an end elevation of the left end of the apparatus;

Fig. 4 is an end elevation of the apparatus looking at it from the right end, showing the position of the operating lever in the beginning and end of the 180° rotation;

Fig. 5 is a schematic diagram of the eelctrical connections between the coils and the fluxmeter;

Fig. 6 is a vertical longitudinal section of the left end of the apparatus taken on the line 6—6 of Fig. 1;

Fig. 7 is a vertical transverse section of the left end of the apparatus, taken on the line 7—7 of Fig. 6;

Fig. 8 is a horizontal section of the apparatus taken on the line 8—8 of Fig. 6; and Fig. 9 is an isometric view of the fluxmeter movement showing the compensating elements.

Referring to the drawings, it will be seen that the apparatus is provided with a base 20, which may be placed upon any flat surface 21, both base and surface being of non-magnetic materials. At this point, it is well to stress that the entire apparatus, excepting the magnets, should be made of non-magnetic materials to prevent any spurious electromagnetic effects. Secured to the top of the base 20 are two oppositely disposed bearing blocks 22 and 23 having apertures 24 and 25 formed therein to provide bearings for a hollow tube 30 of non-magnetic metal, which is journalled in the apertures 24 and 25, and extends a substantial distance through and beyond both bearing blocks.

The construction of both ends of the tube 30 being identical, only one end is described and illustrated in detail herein. The inside diameter of the tube 30 is formed slightly greater for a short distance from the end of the tube to receive the enlarged portion of a coil housing 31, which is generally cylindrical in shape and has one portion of reduced diameter adapted to fit the normal inside diameter of the tube 30. The abrupt changes in diameter of both the tube 30 and the coil housing form complementary abutting shoulders 32 and 33, respectively, facilitating the alignment of the coil housing 31 relative to the tube 30. After proper alignment, the coil housing 31 is rigidly secured to the tube 30 by means of the pin 29. A deep transverse groove 35 is provided in the outer end of the coil housing 31 to house a coil 40 wound around a form 41. The coil form 41 is provided with transverse apertures 42 and 43 at either end to receive insulated bushings 44 and 45, in which are fastened a pair of pins 50 and 51, which provide mounting support for the coil form, and rigid terminals for the coil. The pins 50 and 51 are fitted in insulating bushing inserts 52 and 53 positioned in apertures 54 and 55 formed in the coil housing 31. Coil 40 is held in place by a cap 60 secured to the end of the coil housing 31, an insulator 61 being interposed between the coil and the cap to prevent the coil from being short-circuited through the cap. A secure electrical connection is made between the ends of the coil 40 and the terminal pins 50 and 51, they, in turn, being electrically connected to a pair of leads 62 and 63, which pass through an aperture 64 into the hollow portion of the tube 30 and emerge through an aperture 65 formed at the center of the tube 30. Since there is a coil 66 at the other end of the tube 30, it will be apparent that two pairs of leads, one pair from each coil, will extend through the aperture 65. Each pair of leads should be twisted its entire length up to the coil to counteract the effects of undesired induced currents. A terminal block 67, made from a non-ductor, and having an aperture 70 coincidental with the aperture 65, is provided on the tube 30 to furnish convenient electrical access to the coils, the leads of which are connected to terminal posts on the block 67. The coils are electrically connected to each other in series-opposition and in series with a fluxmeter 71 (Fig. 5).

Identical magnet supports 72 and 73, one for a magnet 76 and the other (73) for a magnet 77 to be tested, are adjustably mounted at either end of the base 20 by securing extending arms 74 and 75 of the magnet supports to adjustable angle members 80—81 and 82—83, respectively. Adjustability of the magnet supports is provided by securing the angle members to the base 20 by means of screws 84 and 85 passing through elongated mounting holes 86 and 87 formed in the angle members. Both magnet supports being similar in construction, the detailed description of only one is herein given. The other end of the arm 74, which has a transversely concave top surface, forms the lower central portion of the magnet support 72. Side pieces 90 and 91, having slots 92 and 93, respectively, formed therein are secured to the arm 74. The edges of the slots 92 and 93 are beveled to receive and provide a seated support for the beveled pole pieces 94 and 95 of the magnet 76. A block 101, having a transversely concave bottom, is fitted between the side pieces 90 and 91 and positioned above the arm 74 so that the concave surfaces of the block 101 and of the arm 74 form a substantially cylindrical cavity, into which tube 30 extends, sufficient clearance being provided so that tube 30 may freely rotate without touching the block 101 or arm 74. The magnet support is normally positioned to align the center of the slots 92 and 93 with the center line of the coil 40. The disposition of the coils 40 and 66 at either end of the tube 30 is such that their longitudinal axes are parallel to each other and cross the longitudinal axis of the tube 30 at right angles thereto. This is done to insure that at all times the angle of rotation around the longitudinal axis of tube 30 of coil 40 with respect to the pole pieces of its associated magnet will be the same as the angle of rotation, about the same axis, of coil 66 with respect to its associated magnet. The magnet supports are of such a height that when the pole pieces of a horn type magnet 76 are fitted into the recesses formed by the slots 92 and 93, the magnet will be suspended free and clear of the flat surface 21 to prevent any possible misalignment due to the bottom of the magnet touching the surface 21. Movable collars 102 and 103, having set screws 104 and 105, encircle the tube 30 and serve to clamp the tube in any predetermined longitudinal position.

To provide means for rotating the tube 30 about its longitudinal axis, an operating lever 110 is securely fastened to the tube 30 near its center and at right angles thereto. Adjustable stops 111 and 112 are provided within the arc of rotation of the lever 110 to align the position of the coils with respect to the pole pieces of the magnets, and to limit the operable rotation of the tube 30 to 180°.

Sensitivity of the apparatus is increased by aligning the coils 40 and 66 in such a manner that during the 180° rotation, the greatest change in the number of flux linkages will take place. This is accomplished by aligning the coils 40 and 66 so that, at the starting point of the rotation, the circular cross sections of the coils 40 and 66 are at right angles to the lines of force between the pole pieces of the magnets 76 and 77, respectively.

The fluxmeter 71 is preferably of the type having a minimum of restorative torque. The movement of such a meter is preferably compensated and damped by the counter EMF generated in the moving coil 113 and, in addition, by a small compensating dipole magnet 114 fixed to an extending member 115 depending from the moving coil 113 of the meter, the poles of the dipole being so disposed within the field of the meter magnets 116 that each pole faces a magnetic field of similar polarity emanating from the permanent magnets of the meter. The strength of the field adjacent the dipole may be varied by two adjustable blocks 120 and 121 of magnetic material disposed in the field of the meter magnets. Since the poles of the dipole face similar polar fields, they will be repelled, the repulsion force working against the torque of the meter movement suspension 122. The strength of the field at the dipole should be adjusted so that at any position of the meter movement the reactive torque of the meter suspension 122 will be as nearly as possible equal to the force of magnetic repulsion at the dipole 114.

In practice, it is convenient to standardize parts of the apparatus to permit comparative magnetic measurements to be made. The coil 66 associated with the support 73 must have a known turns-area value, which is the product representing the number of turns of the coil multiplied by the circular cross-sectional area of the coil in square centimeters. The desired field strength in gauss is then multiplied by the turns-area value, the product being the number of flux linkages that will be produced by the coil 66 and a magnet of the desired field strength. The apparatus is standardized by suspending in the magnet support 72 the magnet 76, the value of which need not be exactly known but, which will, in combination with the coil 40 and after proper adjustment, have a flux linkage of the same value as the coil 66 would have in combination with a magnet of the desired field strength. After placing the magnet 76 in the support 72, the coil 40 is rotated through 180° and the change in the flux linkages observed on the fluxmeter 71. If the desired change is not indicated, then the support 72 is moved to another position by adjusting the angle pieces 80 and 81. The coil 40 is again rotated through 180° and the change in the number of flux linkages again observed. The process is repeated until the desired change in the number of flux linkages is indicated on the fluxmeter. During the above standardization procedure, there should be no magnet in the support 73. A magnet 77 to be tested is then suspended in the support 73 and the lever 110 swung through a 180° arc, thus turning coils 40 and 66 through 180°. The fluxmeter 71 will then indicate the difference between the change in the number of flux linkages produced by the coil 40 and magnet 76 and the change in the number of flux linkages produced by the coil 66 and the magnet 77 under test. The indication on the fluxmeter is not dependent upon the speed of rotation of the coils because the fluxmeter produces an integration of the changes in flux linkages as the coils move through their respective magnetic fields, making the indication independent of the time required for the flux changes.

Where a number of magnets are to be tested for a particular field strength X, the standardization may be simplified by suspending a standard magnet having X field strength in the magnet support 72 and constructing the coils 40 and 66 to have the same turns-area value. The magnet supports should be adjusted to properly align them with the coils. When a magnet 77 to be tested is placed in the magnet support 73 and the coils rotated through 180°, the fluxmeter 71 will indicate the difference, if any, by which the two magnets vary in field strength. If the magnets are equal, deflection of the fluxmeter will be zero.

What is claimed is:

1. An apparatus for measuring magnetic fields of magnets, which comprises a hollow shaft, means mounting the shaft rotatably, a standard magnet mounted at one end of the shaft, means for mounting a magnet to be tested at the other end of the shaft, a search coil keyed to one end of the shaft in the field of the standard magnet, a second search coil keyed to the other end of the shaft in the field of a magnet supported by the mounting means, manually operable means for turning the shaft, means for limiting movement of the shaft to a predetermined angle, a fluxmeter for measuring total interlinkages, and flexible leads extending along the hollow shaft for connecting the coils in series-opposition to the fluxmeter.

2. An apparatus for measuring magnetic fields of magnets, which comprises a hollow shaft composed of non-magnetic material, means mounting the shaft rotatably, a standard magnet mounted at one end of the shaft, means for mounting a magnet to be tested at the other end of the shaft, a search coil, a plug of non-magnetic material keyed to one end of the shaft and supporting the search coil in the field of the standard magnet, a second search coil, a second plug keyed to the other end of the shaft and supporting the second search coil in the field of a magnet supported by the mounting means, manually operable means for turning the shaft, adjustable stop means for limiting movement of the shaft to a predetermined angle, a fluxmeter for measuring total interlinkages, and leads having portions extending along the interior of the shaft for connecting the coils in series-opposition to the fluxmeter.

PAUL F. ELARDE.

References Cited in the file of this patent

UNITED STATES PATENTS

| Number | Name | Date |
|---|---|---|
| Re. 18,555 | Sperry | Aug. 2, 1932 |
| 837,044 | Ellis | Nov. 27, 1906 |
| 2,002,680 | Scott | May 28, 1935 |
| 2,202,884 | Zuschlag | June 4, 1940 |
| 2,231,085 | Morrison et al. | Feb. 11, 1941 |
| 2,231,810 | Kamenarovic | Feb. 11, 1941 |
| 2,291,692 | Claud | Aug. 4, 1942 |
| 2,359,894 | Brown et al. | Oct. 10, 1944 |
| 2,382,743 | Penther et al. | Aug. 14, 1945 |